United States Patent [19]
Ichihara et al.

[11] Patent Number: 5,161,634
[45] Date of Patent: Nov. 10, 1992

[54] ELECTRIC VEHICLE

[75] Inventors: Masahiro Ichihara; Shigenori Kimura, both of Sakai; Yasuhiro Yamamoto, Osaka; Jiro Kuramoto, Osaka; Naoaki Sato, Osaka; Gonshiro Kawabata, Osaka, all of Japan

[73] Assignee: Kubota Corporation, Osaka, Japan

[21] Appl. No.: 670,986

[22] Filed: Mar. 18, 1991

[30] Foreign Application Priority Data

Mar. 27, 1990 [JP] Japan .................................. 2-79831
Mar. 30, 1990 [JP] Japan .................................. 2-85934

[51] Int. Cl.$^5$ .............................................. B60K 31/04
[52] U.S. Cl. .................................. 180/179; 180/65.1; 180/65.8; 180/170; 180/907; 364/426.04
[58] Field of Search .................. 180/170, 179, 65.1, 180/65.8, 907; 364/426.04

[56] References Cited

U.S. PATENT DOCUMENTS 4,415,049 11/1983 Wereb .................................. 180/6.5

FOREIGN PATENT DOCUMENTS 2546529 4/1977 Fed. Rep. of Germany ...... 180/179
3304708 8/1984 Fed. Rep. of Germany ...... 180/907
3714137 10/1987 Fed. Rep. of Germany ...... 180/170
78830 4/1988 Japan .................................. 180/170
114546 5/1989 Japan .................................. 180/170

Primary Examiner—Eric D. Culbreth
Attorney, Agent, or Firm—Webb, Burden, Ziesenheim & Webb

[57] ABSTRACT

An electric vehicle that runs at a speed controlled by adjusting power supply to an electric motor in response to a speed setting signal from a speed setting device including an accelerator lever and a change speed lever. This vehicle comprises a first control unit for producing a target speed value based on the speed setting signal, a second control unit for controlling the electric motor, and a rotary encoder for detecting an actual vehicle speed from rotation of the electric motor and feeding the vehicle speed back to the first and second control units. The first control unit compares the target speed value and actual vehicle speed and, when a difference therebetween exceeds a predetermined value, varies the target speed value for application to the second control unit. The second control unit compares the target speed value and actual vehicle speed and determines an amount of power supply to the electric motor.

8 Claims, 7 Drawing Sheets

ELECTRIC VEHICLE

BACKGROUND OF THE INVENTION

1. Field of the Invention

The present invention relates to an electric vehicle, and more particularly to the technique of controlling running speed of an electric vehicle while maintaining a high degree of safety.

2. Description of the Prior Art

Electric vehicles are attracting attention today as automotive wheelchairs for the aged and those having difficulties of walking. Such a vehicle does not run at high speed as an ordinary automobile does, but runs at a walking speed. With the electric vehicle, therefore, the question of speed control and safety calls for an approach different from that for the ordinary automobile.

In a known technique of controlling running speed of an electric vehicle, an amount of operation of a speed controller such as an accelerator lever is detected with a potentiometer or the like, and the result of detection is used by a control device in determining a power supply to an electric motor.

However, when the vehicle runs on an uphill road, for example, its speed becomes slower, even if the accelerator lever is operated a predetermined amount, than when running on a level ground. When the vehicle runs on a downhill road, the opposite is the case and its speed becomes increased. Thus, there is room for improvement.

Feedback control is well known in the technical field of speed control, in which an actual speed is detected and power supply to the motor is adjusted to cause the speed to follow a target value. This control is suited as an accurate speed control where only minor load variations occur. However, it is not well suited as a speed control where great load variations occur with the motor in running on a sloping road or an unpaved road.

SUMMARY OF THE INVENTION

An object of the present invention is to provide an improved electric vehicle which runs, even on a sloping road, at a speed corresponding to an amount of operation of an accelerator lever.

A further object of the invention is to secure an excellent safety aspect, especially reliability in stopping the electric vehicle.

To fulfill the above objects, the present invention has improved an electric vehicle that runs at a speed controlled by adjusting power supply to an electric motor in response to a speed setting signal from a speed setting device. The electric vehicle according to the invention comprises a first control unit for producing a target speed value based on the speed setting signal from the speed setting device, a second control unit for inputting the target speed value, a vehicle speed detecting device for detecting a vehicle speed and outputting a vehicle speed signal, a first feedback line for transmitting the vehicle speed signal to the first control unit, and a second feedback line for transmitting the vehicle speed signal to the second control unit, wherein the first control means unit includes a target value varying device for comparing the target speed value and the vehicle speed signal and, when a difference therebetween exceeds a predetermined value, varying the target speed value, and the second control unit includes a power supply setting device for comparing the target speed value and the vehicle speed signal and determining an amount of power supply to the electric motor. The electric vehicle of the present invention may include an auxiliary brake, wherein the first control unit is operable to output a target speed value for a zero speed value and, simultaneously, output a brake operating signal to the auxiliary brake.

According to the present invention, the control units are provided to adjust power supply to the electric motor for propelling the vehicle, in response to the signal received from the speed setting device. A target speed value, which is computed from the speed setting signal, is compared with an actual vehicle speed. In the event of a difference therebetween exceeding a predetermined value, a correction value is applied to the target speed value to diminish the difference. In this way, the power supply to the electric motor is adjusted with a new control target value different from a target value in the ordinary feedback control.

Thus, the invention is a rationalized automotive vehicle which can run at a speed corresponding to an amount of operation of an accelerator lever, or the like, even on a sloping or an unpaved road.

Other objects and features of this invention will be understood from the following description made with reference to the accompanying drawings.

DETAILED DESCRIPTION OF THE PREFERRED EMBODIMENTS

Embodiments of the present invention will be described hereinafter with reference to the drawings.

Figure 1:
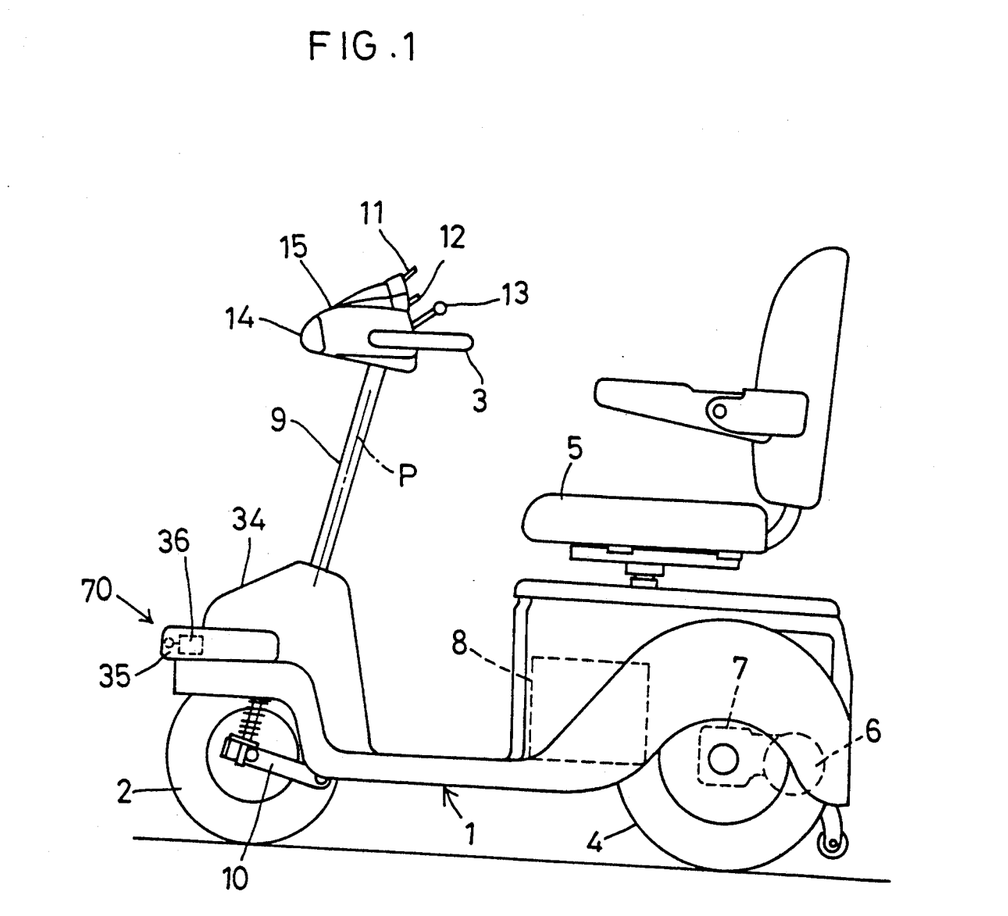
FIG. 1 is a side view of a small electric vehicle according to the present invention.
Figure 2:
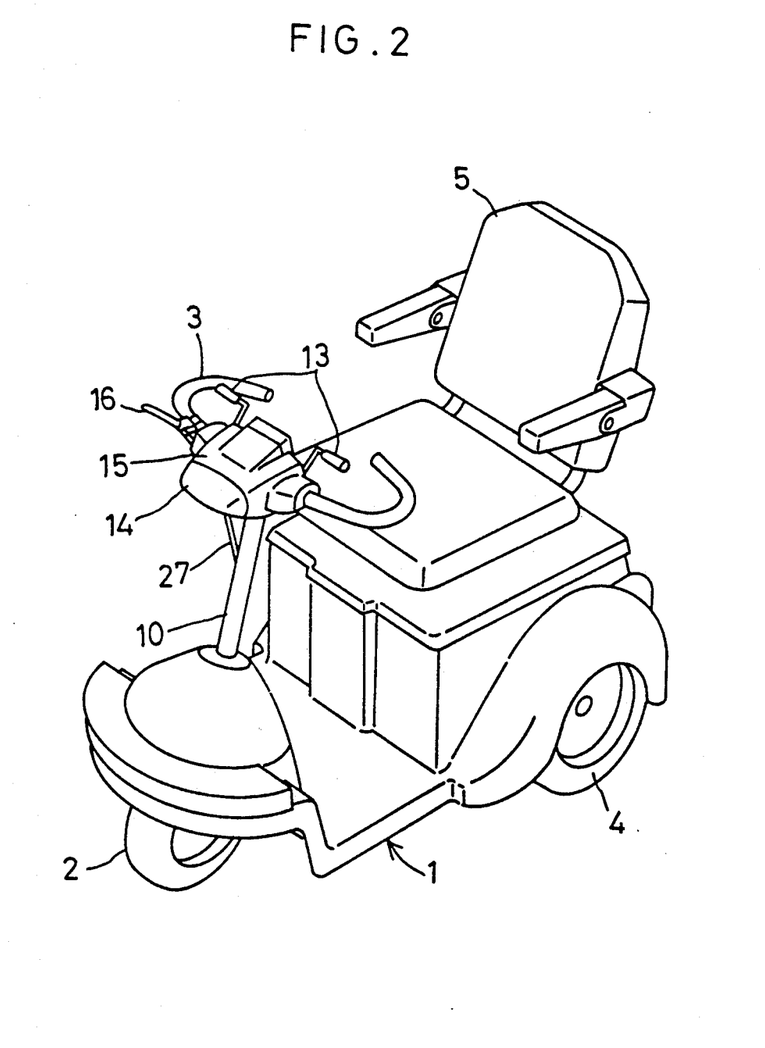
FIG. 2 is a perspective view of the electric vehicle shown in FIG. 1.

As shown in FIG. 1, a small, three-wheel electric vehicle comprises a vehicle body 1 formed of metal pipe frames and a plastic cover placed thereon. The vehicle body 1 has a single steerable front wheel 2, a handle 3 for steering the front wheel 2, right and left rear wheels 4 and a seat 5.

The rear wheels 4 are journaled in a reduction case 7 having an electric pulse motor 6. The electric motor 6 receives power supply from a battery 8 mounted under the seat 5.

As shown in FIG. 1, the vehicle body 1 supports a steering stem 9 to be rotatable about a vertical axis P. The steering stem 9 has suspension arms 10 vertically, oscillatably or attached to a lower end thereof and rotatably supporting the front wheel 2. Further, the steering stem 9 carries the handle 3 attached to an upper end thereof, which is in the form of letter C opening rearward, as well as a control box 15. The control box 15 includes a change speed lever 11 having three selector positions for high speed, intermediate speed and low speed, various switches including a backward/forward changeover switch 12, accelerator levers 13 selectively controllable by either hand, and a head light 14. A hand brake lever 16 is provided on a righthand portion of the handle 3 to be operable by gripping.

Figure 3:
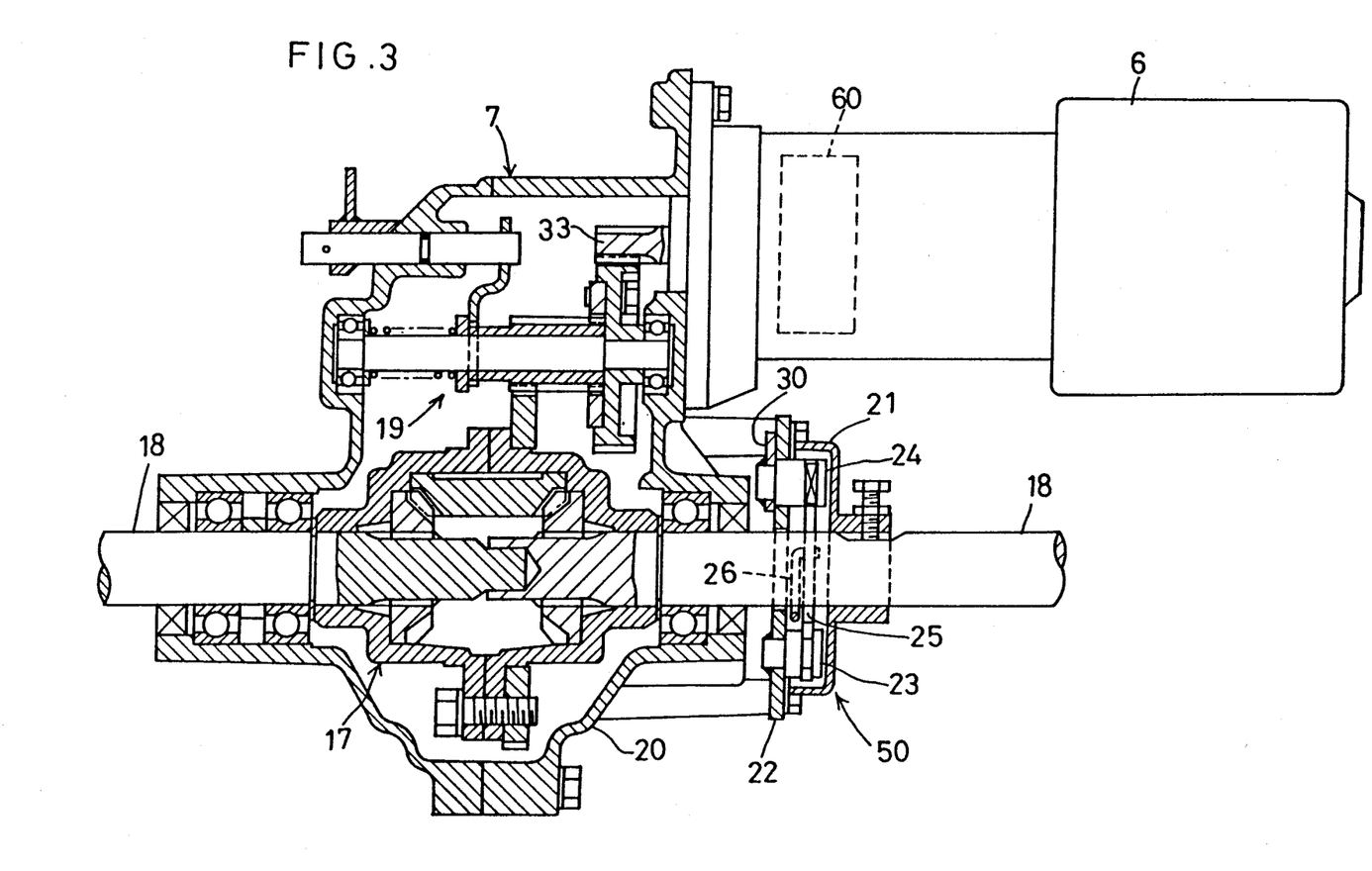
FIG. 3 is a sectional view of a transmission.

FIG. 3 shows a transmission structure of this electric vehicle.

Drive from the electric motor 6 is reduced by gearing mounted in the reduction case 7 and transmitted through a differential 17 to right and rear axles 18. The reduction case 7 houses a mechanism 19 operable to switch the gear reduction to a free rotation state for allowing the electric vehicle to be pushed.

The differential 17 is mounted in a differential case 20 carrying a manually operable brake 50 having an internal expanding drum brake structure for acting on the left rear axle 18.

Figure 4:
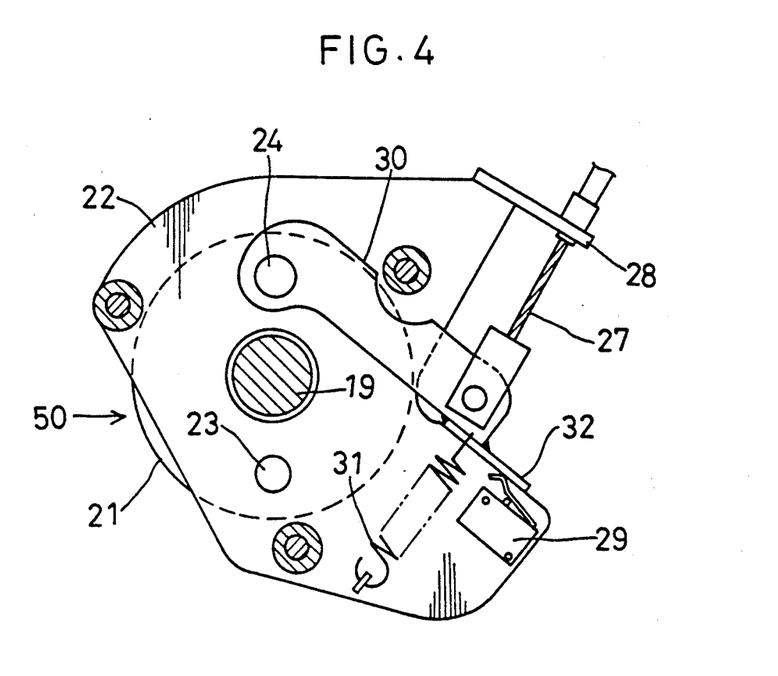
FIG. 4 is an enlarged side view of a manual braking device.

As shown in FIGS. 3 and 4, the brake 50 includes a rotary drum 21 fixed to the left rear axle 18, a panel plate 22 bolted to an end face of the differential case 20, an anchor pin 23 fixed to the panel plate 22, a brake cam 24 rotatably extending through the panel plate 22, a pair of brake shoes 25 extending between the cam 24 and anchor pin 23, and a spring 26 for urging the shoes 25 toward each other.

The panel plate 22 carries a wire holder 28 for holding a brake wire 27, and a limit switch 29. The cam 24 is fixed to a cam lever 30 to which the brake wire 27 is pivotally connected. A return spring 31 is provided to urge the cam lever 30 in a direction to close the shoes 25.

The cam lever 30 includes a restrictor plate 32 attached to an end thereof for contacting an end face of the panel plate 22 and setting a return limit position of the cam lever 30. The restrictor plate 32 turns on the normally open limit switch 29 when the cam lever 30 is in a return position.

Figure 5:
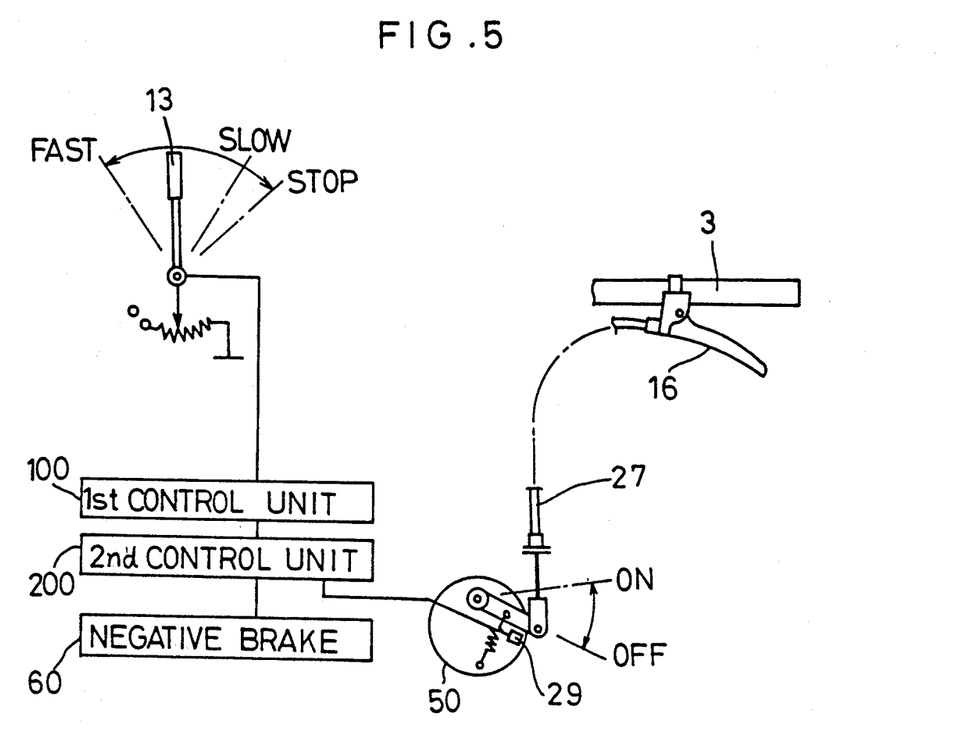
FIG. 5 is a schematic view of an interlocking structure among the manual braking device, a negative brake and an accelerator lever.

As shown in FIG. 5, the brake wire 27 is connected to the brake lever 16 attached to the handle 3. When the brake lever 16 is gripped, the wire 27 is pulled to operate the brake 50. At the same time the limit switch 29 transmits a signal to a second control unit 200, which will be described later, connected to a first control unit 100, which will also be described later.

The electric motor 6 includes a negative brake 60 releasable by an electromagnetic force. When the electromagnetic force is removed the negative brake operates to apply a braking force to motor shaft 33. A negative brake which is known in the art and whose particular construction will not be described. The negative brake 60 applies a braking force based on a spring load to a motor shaft 33 #10a, #20a and #30a is removed by means of an electromagnetic force resulting from a power supply which overcomes the spring load. The negative brake 60 is operable to apply a braking force to motor shaft 33 when the accelerator lever 13 is returned to a stop position.

Further, as seen from FIG. 1, the electric vehicle comprises an obstacle detector 70 including a limit switch 36 operable with movement of a bumper 35 mounted on a forward end of a front fender 34 to be slidable backward and forward. This limit switch 36 also is connected to the second control unit 200. The negative brake 60 is operated when the bumper moves rearward through a collision with a foreign object, for example.

Figure 6:
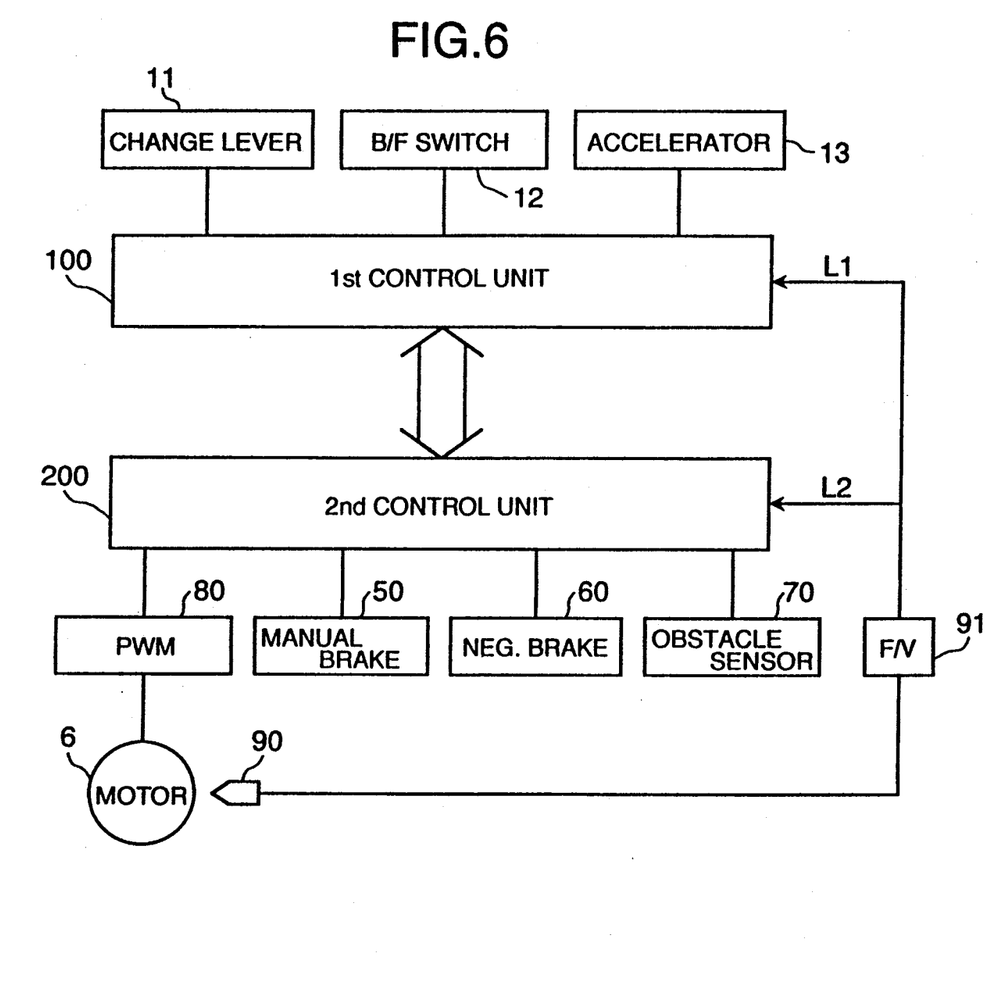
FIG. 6 is a block diagram of a speed control system.

FIG. 6 shows a block diagram of a speed control system including a braking system for the electric vehicle according to the present invention. As seen from this block diagram, the accelerator levers 13 apply, through an associated potentiometer, a speed setting signal corresponding to a selected speed position to the first control unit 100. Similarly, the change speed lever 11 notifies the first control unit 100, through a switch circuit not shown, of a selected speed stage, e.g. the high speed, intermediate speed or low speed stage. The backward/forward changeover switch 12 also transmits its output directly to the first control unit 100. The second control unit 200 connected to the first control unit 100 receives a speed control signal from the first control unit 100. The second control unit 200 converts the speed control signal to a drive pulse signal for application through a pulse wave modulator 80 to the motor 6 acting as a drive source of the vehicle. The second control unit 200 is further connected to the negative brake 60, obstacle sensor 70, and the limit switch 29 for detecting operation of the hand brake 50.

The pulse motor 6 includes a rotary encoder 90 having two transmission type photosensors arranged with a 90-degree phase angle. The encoder 90 detects a direction and rate of rotation of the motor 6, and feeds detection signals back to the first and second control units 100 and 200 through a frequency-to-voltage converter 91.

In the speed control with this construction, the first control unit 100 derives a target speed value from a position of the accelerator lever 13, i.e. a value provided by the associated potentiometer, on the basis of a selected position of the change speed lever 11 and a state of the backward/forward changeover switch 12. Maximum speeds in forward running are set to 6.0 km/h, 4.5 km/h and 1.5 km/h for the high speed, intermediate speed and low speed positions of the change speed lever 11, respectively. In backward running, maximum speeds are set to 3.0 km/h, 2.5 km/h and 1.0 km/h for the high speed, intermediate speed and low speed positions of the change speed lever 11, respectively.

The target speed value derived is transmitted to the second control unit 200 where the target speed value is compared with an actual speed value corresponding to the rotational rate signal received from the encoder 90. The second control unit 200 determines a quantity of power supply to the pulse motor 6 to eliminate a difference between the two values. The speed control signal corresponding to the quantity of power supply is transmitted to the pulse wave modulator 80.

Further, the first control unit 100 compares the target speed value computed by the first control unit 100 with the actual speed value corresponding to the rotational rate signal received from the encoder 90. When the difference therebetween exceeds a predetermined value, a correction value is added to the target value if the difference is positive, and a correction value is subtracted from the target value if the difference is negative. Subsequently, the corrected target value is transmitted to the second control unit 200. If, for example, the target speed is set to 5 km/h but the actual speed is 1 km/h, the vehicle is regarded as running on an uphill road. In this case, a correction value, e.g. 5 km/h, is added to make the target value 10 km/h which is output as a target value for the speed control by the second control unit 200. As a result, the vehicle runs at a speed faithful to operation of the change speed lever 11 and accelerator lever 13.

In a preferred form of the invention, the first control unit 100 includes a microcomputer as a main component thereof, and realizes the feedback control with software. The second control unit 200 realizes the feedback control with hardware including a differential amplifier as a main component thereof. This is illustrated by a first feedback line L1 and a second feedback line L2 in FIG. 6.

The braking system will be described next.

When the accelerator lever 13 is set to zero speed, i.e. the stopping position, the target speed value is forcibly reduced to zero to break the power supply to the motor 6. The motor 6 with the power supply disrupted now acts as a generator brake, and the power to the negative brake 60 is cut at the same time. As a result, the negative brake 60 assumes a braking state under the spring load, thereby contributing to positive stopping of the vehicle.

When the hand brake is operated at a time of emergency, the power to the negative brake is cut also, which stops the vehicle reliably.

The negative brake operates similarly when the obstacle sensor 70 is turned on.

The sequence in which the first control unit 100 computes a target speed value will be described with reference to FIG. 7.

First, at steps #10a, #20a and #30a, the first control unit 100 accepts the signals indicating states of the change speed lever 11, backward/forward changeover switch 12 and accelerator lever 13, respectively. Then, at step #40a, a target value is computed referring to a table formed by using the states of the change speed lever 11, backward/forward changeover switch 12 and accelerator lever 13 as parameters. At step #50a, an actual speed value: R is determined from the signal corresponding to a rotational rate of the motor 6 detected by the encoder 90. At step #60a, the target value: S is compared with the actual value: R, taking a predetermined value: K into account. If the comparison results in S>R+K, a new target value is set by adding a correction value to the target value at step #70a. If S+K<R, a new target value is set by subtracting a correction value from the target value at step #80a. In other cases, i.e. if K> =absolute value(S-R), the target value is not changed.

After this processing, the target value is transmitted to the second control unit 200, where the target value is compared with the signal corresponding to the rotational rate of the motor 6 detected by the encoder 90 as a reference quantity for the differential amplifier. The output of the differential amplifier is transmitted to the pulse wave modulator 80 where the output is converted into appropriate pulses for rotating the pulse motor 6.

Figure 8:
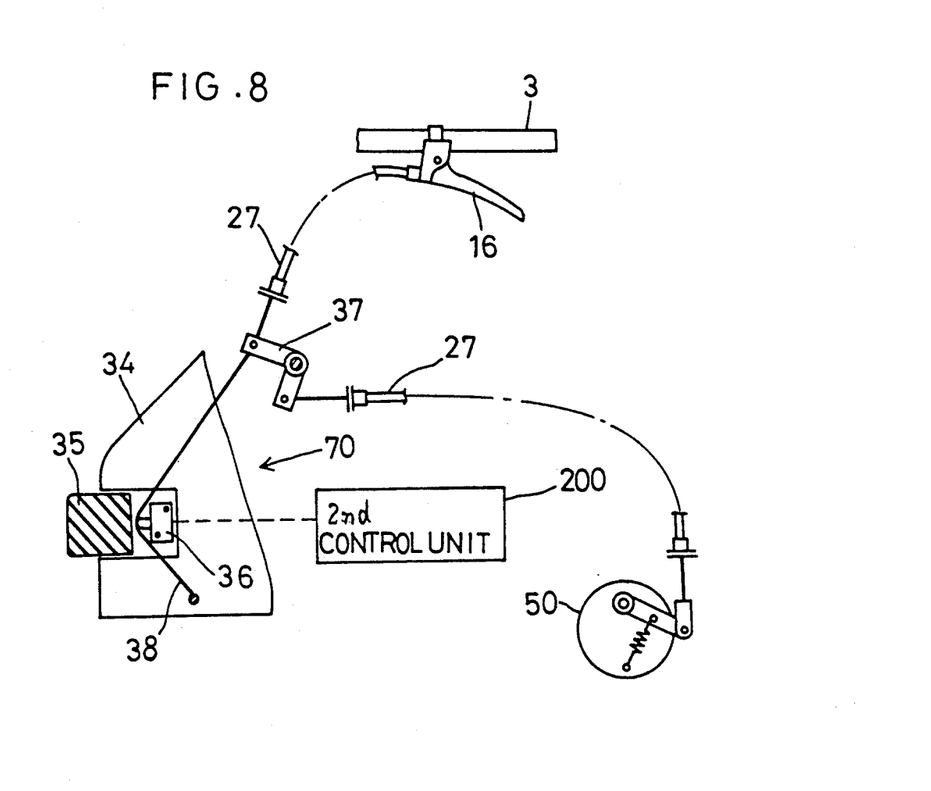
FIGS. 8 and 9 are schematic views of modified interlocking structures between the braking device and negative brake.
Figure 9:
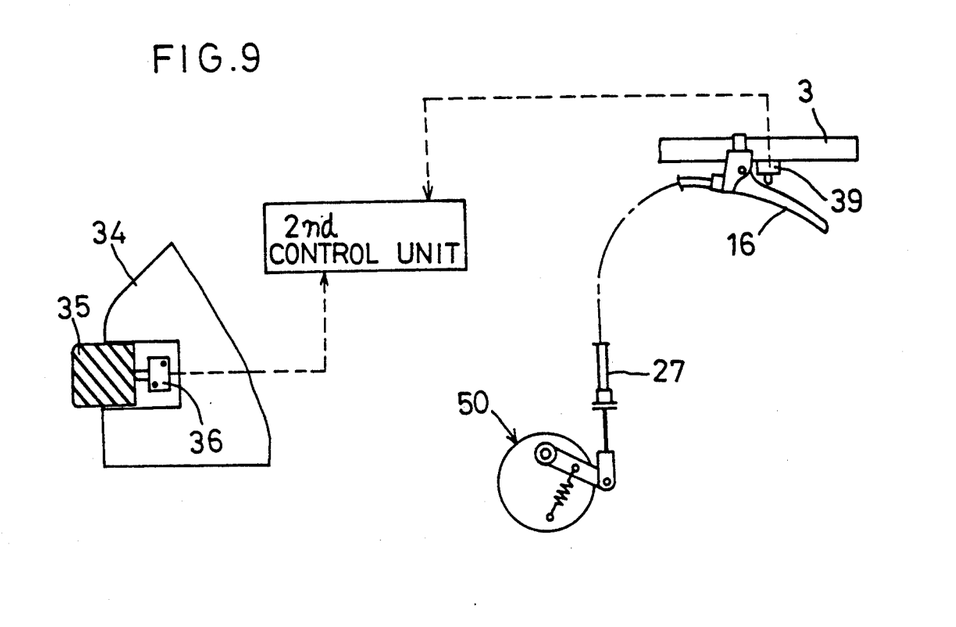

FIGS. 8 and 9 show modified interlocking structures between the brake 50 and obstacle detector 70.

1) As shown in FIG. 8, an oscillatable link 37 may be provided in an intermediate position of the brake wire 27, with an interlocking wire 38 surrounding the front of the limit switch 36, fixed at a lower end thereof, and connected at an upper end to the link 37.

2) As shown in FIG. 9, the hand brake lever 16 may include a limit switch operable with gripping of the brake lever 16, this limit switch 39 and the limit switch 36 associated with the bumper 35 being connected to the second control unit 200.

In the above construction, the interlocking wire 38 is pulled when the brake lever 16 is gripped, to forcibly move the limit switch 36 rearwardly and operate the limit switch 36.

The brake 50 and negative brake 60 may be arranged to act on the front wheel 2 or righthand rear wheel 4.

The brake control device 16 may comprise a foot brake pedal.

What is claimed is:

1. An electric vehicle that runs at a speed controlled by adjusting power supply to an electric motor in response to a speed setting signal from speed setting means, comprising:

first control means for producing a target speed value based on said speed setting signal from said speed setting means, second control means for adjusting power supply to said electric motor and in which said target speed value produced by said first control means is inputted, vehicle speed detecting means for detecting a vehicle speed and outputting a vehicle speed signal, a first feedback line for transmitting said vehicle speed signal to said first control means, and a second feedback line for transmitting said vehicle speed signal to said second control means, wherein said first control means includes target value varying means for comparing said target speed value and said vehicle speed signal and, when a difference therebetween exceeds a predetermined value, varying said target speed value, and said second control means includes power supply setting means for comparing said target speed value inputted from said first control means and said vehicle speed signal and determining an amount of power supply to said electric motor.

2. An electric vehicle as claimed in claim 1, wherein said target value varying means is operable to add a correction value to said target speed value based on said speed setting signal for application to said second control means when said vehicle speed signal is less than said target speed value by a predetermined value, and to subtract the correction value from said target speed value based on said speed setting signal for application to said second control means when said vehicle speed signal is greater than said target speed value by the predetermined value.

3. An electric vehicle as claimed in claim 2, wherein said speed setting means includes an accelerator lever for setting speeds steplessly, and a change speed lever for selecting a desired one of a plurality of stages, said first control means being operable to vary methods of computing the target speed value and correction value based on a value set by said accelerator lever in accordance with a selected stage.

4. An electric vehicle as claimed in claim 1, further comprising an auxiliary brake, wherein said first control means is operable to output a target speed value signal for zero speed value and at the same time output a brake operating signal to said auxiliary brake as well.

5. An electric vehicle as claimed in claim 4, wherein said auxiliary brake is a negative brake releasable by an electromagnetic force and, when the electromagnetic force is removed, operable to apply a braking force by a mechanical means.

6. An electric vehicle as claimed in claim 5, wherein said mechanical means is a spring.

7. An electric vehicle as claimed in claim 4, further comprising hand brake means, wherein said hand brake means includes braking operation detecting means connected to said second control means, said brake operating signal being applied to said auxiliary brake simultaneously when a braking operation is detected.

8. An electric vehicle as claimed in claim 4, wherein said auxiliary brake is a negative brake.

* * * * *

UNITED STATES PATENT AND TRADEMARK OFFICE
CERTIFICATE OF CORRECTION

Figure 7:
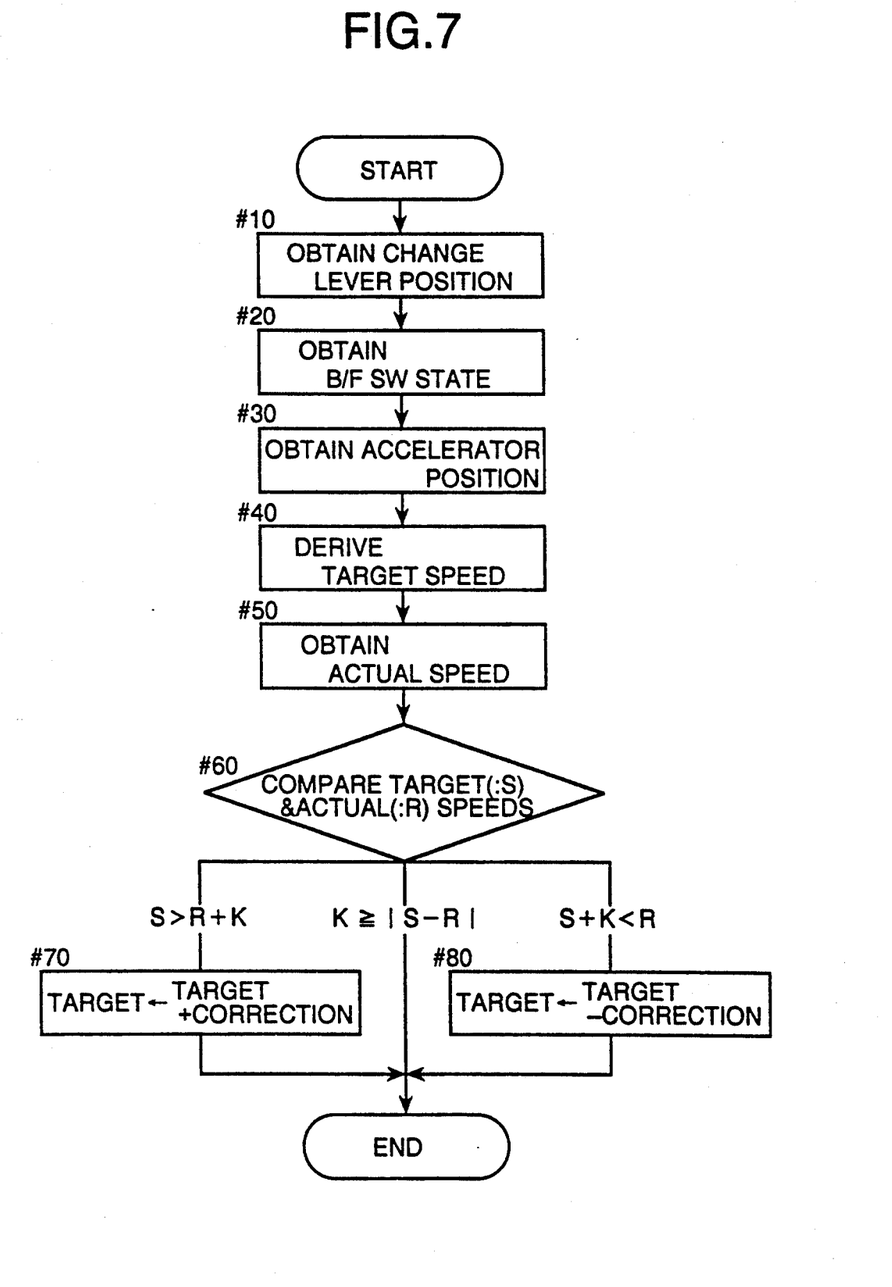
FIG. 7 is a flowchart of a speed control sequence.

PATENT NO. : 5,161,634
DATED : November 10, 1992
INVENTOR(S) : Masahiro Ichihara, Shigenori Kimura, Yasuhiro Yamamoto, Jiro Kuramoto, Naoaki Sato, and Gonshiro Kawabata It is certified that error appears in the above-indentified patent and that said Letters Patent is hereby corrected as shown below:

The drawing sheet, consisting of Fig. 7, should be deleted to be replaced with the sheet of drawing , consisting of Fig 7, as shown on the attached page.

Column 2, line 63, "or attached" should read --attached--.

Column 3, line 54, "#10a, #20a and #30a" should read --and the braking force --.

Signed and Sealed this

Twenty-sixth Day of October, 1993

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,161,634

DATED : November 10, 1992

Page 2 of 2

INVENTOR(S) : Masahiro Ichihara, Shigenori Kimura, Yasuhiro Yamamoto, Jiro Kuramoto, Naoki Sato, and Gonshiro Kawabata It is certified that error appears in the above-indentified patent and that said Letters Patent is hereby corrected as shown below:

FIG.7